US006586528B1

(12) United States Patent
Delaite et al.

(10) Patent No.: US 6,586,528 B1
(45) Date of Patent: Jul. 1, 2003

(54) COMPOSITION BASED ON PROPYLENE POLYMERS AND PROCESS FOR OBTAINING SAME

(75) Inventors: Emmanuel Delaite, Braine-Le-Comte; Hervé Cuypers, Ceroux-Mousty, both of (BE)

(73) Assignee: Polypropylene Belgium (Naamlose Vennootshap), Warrenville, IL (US)

( * ) Notice: Subject to any disclaimer, the term of this patent is extended or adjusted under 35 U.S.C. 154(b) by 0 days.

(21) Appl. No.: 09/712,167

(22) Filed: Nov. 15, 2000

(51) Int. Cl.$^7$ .......................... C08L 23/00; C08L 23/04
(52) U.S. Cl. ..................................... 525/191; 525/240
(58) Field of Search ................................ 525/240, 191

(56) References Cited

U.S. PATENT DOCUMENTS

| | | | |
|---|---|---|---|
| 4,210,729 A | 7/1980 | Hermans et al. | |
| 4,626,555 A | 12/1986 | Endo et al. | |
| 5,204,305 A | 4/1993 | Fiasse et al. | |
| 5,948,547 A | * 9/1999 | Mikielski et al. ........... | 428/516 |
| 6,040,348 A | 3/2000 | Delaite et al. | |
| 6,110,986 A | 8/2000 | Nozawa et al. | |
| 6,251,995 B1 | * 6/2001 | Hesse et al. ................. | 525/191 |

FOREIGN PATENT DOCUMENTS

| | | |
|---|---|---|
| DE | 44 20 590 A1 | 12/1995 |
| EP | 0 261 727 A1 | 9/1986 |
| EP | 0 317 995 A2 | 11/1987 |
| EP | 0 334 411 A1 | 3/1988 |
| EP | 0 470 701 | 2/1992 |
| EP | 0 483 682 | 5/1992 |
| EP | 0 860 457 A1 | 8/1998 |
| EP | 0 893 470 | 1/1999 |
| EP | 0 893 470 A1 | 1/1999 |

OTHER PUBLICATIONS

R.J. Crawford, "Plastics Engineering" $2^{nd}$ Edition, 1987, pp. 3–4.

* cited by examiner

Primary Examiner—Nathan M. Nutter
(74) Attorney, Agent, or Firm—Wallace L. Oliver; Nirav Patel

(57) ABSTRACT

The present invention provides a composition, which includes:

(a) from 55 to 74 parts by weight of a propylene polymer (A) which includes less than or equal to 1% by weight of ethylene and having a melt flow index (MFI) of 0.1 to 30 g/10 minutes, measured according to ASTM D 1238 (1986) under a load of 2.16 kg at 230° C.; and (b) from 26 to 45 parts by weight of a polymer (B), which is a statistical copolymer of propylene including from 3.5 to 15 wt % of ethylene and having an MFI of 0.1 to 35 g/10 minutes. Another embodiment of the invention provides an article, which includes the above-described composition. Another embodiment of the invention provides a process for preparing the above-described composition, which includes two successive polymerization stages, wherein 55 to 74 parts by weight of polymer (A) and from 26 to 45 parts by weight of polymer (b) are respectively prepared.

21 Claims, No Drawings

COMPOSITION BASED ON PROPYLENE POLYMERS AND PROCESS FOR OBTAINING SAME

BACKGROUND OF THE INVENTION

1. Field of the Invention

The present invention relates to a composition based on propylene polymers exhibiting an improved compromise between rigidity and weldability. It relates more particularly to a composition suitable for use in making numerous articles such as expanded granules as well as to a process for preparation of such a composition.

2. Discussion of the Background

It is known that propylene polymers can be used for numerous applications such as the manufacture of preformed articles, films, sheets and cellular articles. In these applications, polypropylene is preferred to other plastic materials by virtue of its chemical resistance, its heat resistance and/or its impact resistance and rigidity.

For example, European Patent Application 0860457 describes the use of a propylene block copolymer containing 60 to 90 wt % of a propylene homopolymer and 40 to 10 wt % of a statistical propylene copolymer containing 1 to 10 wt % of ethylene for the manufacture of molded articles such as, in particular, bioriented bottles. The preferred compositions, which contain 20 wt % of a propylene homopolymer with high isotacticity, have insufficient weldability and excessively high rigidity for applications such as the manufacture of cellular articles.

In addition, European Patent Application 0893470 discloses the use, for the manufacture of expanded granules, of compositions containing 60 to 90 parts by weight of a propylene homopolymer having a melt flow index (MFI) ranging from 0.1 to 20 g/10 minutes and 40 to 10 parts by weight of a statistical propylene copolymer which contains 3 to 20 mol % of a comonomer such as ethylene and which has an MFI of 25 to 3000 g/10 minutes. However, the use of the preferred compositions, in which the ratio of the MFI of the copolymer to that of the homopolymer is greater than 20, leads to heterogeneities. In addition, the use of such resins is economically disadvantageous because of their high manufacturing cost.

Finally, German Patent Application 4420590 discloses polyolefin foam particles of uniform density obtained from a mixture compatible with at least two different propylene polymers, the majority of the said mixture being formed from propylene copolymers and terpolymers, at least one of which contains 1-butene. Again, the high cost of the compositions due to the butene copolymer or copolymers (low polymerization yield, cost of monomer recycling installations) prevents their widespread use.

SUMMARY OF THE INVENTION

Accordingly, one object of the present invention is to provide a composition which does not suffer from the disadvantages of the conventional compositions.

Another object of the present invention is to provide a composition having improved processability.

Another object of the present invention is to provide a composition having a good balance of mechanical properties and sealing properties.

These and other objects have now been achieved by the present invention, the first embodiment of which provides a composition, which includes:

(a) from 55 to 74 parts by weight of a propylene polymer (A) which includes less than or equal to 1% by weight of ethylene and having a melt flow index (MFI) of 0.1 to 30 g/10 minutes, measured according to ASTM D 1238 (1986) under a load of 2.16 kg at 230° C.; and (b) from 26 to 45 parts by weight of a polymer (b), which is a statistical copolymer of propylene including from 3.5 to 15 wt % of ethylene and having an MFI of 0.1 to 35 g/10 minutes.

Another embodiment of the invention provides an article, which includes the above-described composition.

Another embodiment of the invention provides a process for preparing the above-described composition, which includes two successive polymerization stages, wherein 55 to 74 parts by weight of polymer (A) and from 26 to 45 parts by weight of polymer (B) are respectively prepared.

DESCRIPTION OF THE PREFERRED EMBODIMENTS

Various other objects, features and attendant advantages of the present invention will be more fully appreciated as the same becomes better understood from the following detailed description of the preferred embodiments of the invention.

Preferably, the composition according to the present invention includes:

from 55 to 74 parts by weight of a propylene polymer (A) not containing more than 1% by weight of ethylene and having a melt flow index (MFI) of 0.1 to 30 g/10 minutes, measured according to ASTM D 1238 (1986) under a load of 2.6 kg at 230° C., and from 26 to 45 parts by weight of a polymer (B), which is a statistical copolymer of propylene containing from 3.5 to 15% of ethylene and having an MFI of 0.1 to 35 g/10 minutes.

Preferably, polymers (A) and (B) are semicrystalline within the meaning conveyed in "Plastics Engineering", 2nd Edition, R. J. Crawford, Pergamon Press (1987), pages 3 and 4, the entire contents of which are hereby incorporated by reference. Preferably, they contain less than 1 wt % of monomeric units derived from 1-butene. Compositions whose polymers (A) and (B) do not contain any monomeric units derived from 1-butene are particularly preferred.

Preferably, polymer (A) has a modulus of elasticity in flexion (measured at 23° C. on an injection-molded specimen with a thickness of 4 mm in accordance with ASTM D 790 M-flexural modulus) of 1200 to 2000 MPa. More preferably the above-noted flexural modulus ranges from 1400 to 1800 MPa, and most preferably 1500 to 1600 MPa. These ranges include all values and subranges therebetween, including 1300, 1700 and 1900 MPa. Preferably polymer (B) has a flexural modulus of 300 to 800 MPa. More preferably, the flexural modulus of polymer (B) ranges from 400 to 700 MPa, and more particularly preferably from 500 to 600 MPa. These ranges include all values and subranges therebetween, including 350, 450, 550, and 750.

Preferably, polymer (A) contains at most 0.75 wt % of ethylene. More preferably polymer (A) contains at most 0.5% ethylene, more particularly preferably 0.25 wt %. Compositions in which polymer (A) is a propylene homopolymer yield particularly good results. These ranges include all values and subranges therebetween, including 0.7, 0.6, 0.4, 0.3 and 0.1 wt %.

Preferably, polymer (A) has an isotacticity index, appraised by the molar fraction of isotactic triads according to the method described in connection with the examples, of at most 98% and more preferably of at most 97%. More particularly preferably the index is at most 96%, and most preferably at most 95%. These ranges include all values and subranges therebetween, including 97.8, 97.7, 97.6, 97.5 and 97.3.

Preferably, polymer (B) contains at least 4 wt % of ethylene. More preferably, polymer (B) contains at least 5 wt % ethylene, more particularly preferably at least 6 wt %, and most preferably at least 8 wt %. Polymers (B) containing at most 10 wt % of ethylene are particularly preferred. These ranges include all values and subranges therebetween, including 4.5, 5.5, 6.5, 7, 8.5, 9 and 9.5 wt %.

The comonomer contents mentioned in the present specification are determined by Fourier transform IR spectrometry on the polymer worked into a pressed 200 μm film (thickness). The ethylene contents are estimated from the absorption bands at 732 and 720 cm$^{-1}$.

Preferably, the MFI of polymers (A) and (B) (MFI$_{(A)}$ and MFI$_{(B)}$) is at least 1 g/10 minutes, more preferably at least 2 g/10 minutes, more particularly preferably at least 3 g/10 minutes. These ranges include all values and subranges therebetween, including 1.1, 1.5, 1.75, 2.2, 2.5, 3.1, 4.4 and 5.5. Preferably, MFI$_{(A)}$ is at most 15 g/10 minutes, more preferably at most 10 g/10 minutes and more particularly preferably at most 5 g/10 minutes. These ranges include all values and subranges therebetween, including 14, 13, 12, 11, 9, 8, 7, 6, 4, and 2. Preferably, MFI$_{(B)}$ is at most 30 g/10 minutes, and more preferably at most 20 g/10 minutes, and most preferably at most 15 g/10minutes. These ranges include all values and subranges therebetween, including 28, 25, 23, 18, 16, 14, 12, 10, 8 and 7.

It is also pointed out that the MFI$_{(B)}$/MFI$_{(A)}$ ratio is advantageously such that 0.8≦MFI$_{(B)}$/MFI$_{(A)}$≦18. More preferably, the ratio ranges from 1 to 16, more particularly preferably from 2 to 12, most preferably from 4 to 10, and most particularly preferably from 5 to 8. These ranges include all values and subranges therebetween, including 0.9, 3, 7, 11, 13, 14, 15 and 17.

The composition contains from 55 to 74 parts by weight of a propylene polymer (A). More preferably, the composition contains from 60 to 70 parts by weight of (A), and more particularly preferably from 63 to 68 parts by weight of (A). These ranges include all values and subranges therebetween, including 56, 58, 62, 67, 71 and 73.

The composition contains from 26 to 45 parts by weight of polymer (B). More preferably, the composition contains from 30 to 40 parts by weight of polymer (B), and more particularly preferably from 33 to 38 parts by weight of (B). These ranges include all values and subranges therebetween, including 28, 31, 32, 36, 39, 41 and 43.

Compositions which contain from 57 to 72 wt % of polymer (A) and from 43 to 28 wt % of polymer (B) yield particularly good results.

Apart from polymers (A) and (B), the inventive composition may additionally and optionally contain known conventional adjuvants such as stabilizers, pigments, coloring agents, fillers, nucleating agents, fire-retarding agents, antistatic agents, lubricants, non-stick agents, etc. Most preferably, however, the inventive composition contains only polymers (A) and (B) as polymers.

The MFI value of the composition preferably ranges from 0.1 to 30 g/10 minutes. This value is preferably at least 3 g/10 minutes. It is also preferably at most 15 g/10 minutes, and more particularly at most 12 g/10 minutes. These ranges include all values and subranges therebetween, including 2, 4, 5, 6, 8, 10, 11, 13, 14, 16, 18, 19, 22, 25, 28 and 29. Different MFI values may make the composition difficult to use.

The inventive composition preferably has a flexural modulus of 700 to 1700 MPa, more preferably 800 to 1600 MPa, more particularly preferably 900 to 1400 MPa, most preferably 1000 to 1200 MPa. Most often, however, this flexural modulus is at least 900 MPa and does not exceed 1500 MPa. These ranges include all values and subranges therebetween, including 1100, 1300, and 1500.

Compositions which are particularly preferred have a flexural modulus of 1000 to 1400 MPa and an MFI of 4 to 12 g/10 minutes.

The composition according to the invention exhibits good mechanical properties at high temperature. It also exhibits good processability, good mechanical properties and good weldability. It can be processed by all the standard methods for working of thermoplastic materials, such as, for example molding, extrusion and injection, and in all machines and devices used for such purposes. The inventive composition is particularly well suited for the manufacture of expanded granules used in production of cellular articles. Transformation of the inventive composition to preformed articles is familiar to those skilled in the art. Transformation of the inventive composition to expanded granules and subsequent molding to cellular articles is preferably achieved in the conventional manner described, for example, in European Patent Application 0317995, U.S. Pat. No. 4,626,555 and European Patent Application 893470, the entire contents of each of which are hereby incorporated by reference.

Polymers (A) and (B) can be prepared in the presence of any catalytic system known to be sufficiently productive and stereospecific, permitting the propylene to be polymerized in isotactic form and capable of incorporating the required quantities of ethylene in the polymer. Such catalytic systems as well as the general conditions for synthesis of these polymers are well known to those skilled in the art.

Polymers (A) and (B) are preferably obtained by polymerization of propylene and, as the case may be, of ethylene by means of catalytic systems comprising a solid based on titanium trichloride, an alkylaluminum and optionally an electron donor. Particularly preferable catalytic systems of this type are described in European Patent Applications 0261727 and 0334411 and in U.S. Pat. No. 4,210,729 and 5,204,305 (Solvay Polyolefins Europe, Belgium), the entire contents of each of which are hereby incorporated by reference. These catalytic systems permit particularly statistical incorporation of ethylene and lead to the production of polymers having the form of powder with excellent morphology (narrow particle size distribution and regular particles of spheroidal form).

The statistical polymers which are preferentially usable as polymer (B) and, as the case may be, as polymer (A) satisfy the equation:

$$\{C_{2\times5+}\} \leq 0.0094 \{C_{2\times3}\}^2 - 0.0054 \{C_{2\times3}\} + 0.0375$$

in which $\{C_{2\times5+}\}$ and $\{C_{2\times3}\}$, expressed in g/kg and evaluated by Fourier transform infrared absorption spectrometry on the polymer worked into a pressed 200 μm film, represent respectively:

$\{C_{2\times5+}\}$: the ethylene content corresponding to insertion of two or more than two consecutive ethylene units, measured at 720 cm$^{-1}$, and $\{C_{2\times3}\}$: the ethylene content corresponding to the insertion of one ethylene unit between two propylene units, measured at the maximum of the absorption band around 732 cm$^{-1}$.

The MFI values of polymers (A) and (B) can be regulated by addition of one or more known molecular weight regulators. The most commonly used of these is hydrogen.

The required quantities of monomer(s) and molecular weight regulator(s) can be introduced continuously or batchwise into the polymerization medium.

Another preferred embodiment of the invention is manufacture of the inventive composition, which is accomplished by mixing polymer (A) and polymer (B) with one another. This mixing process can be achieved by any known process whatsoever, including without limitation blending, extruding and/or melt processing.

Polymers (A) and (B) can be mixed by synthesizing polymer (A) or (B) and then, in the same medium or in a different medium into which polymer (A) or (B) is introduced, synthesizing polymer (B) or (A). Polymers (A) and (B) can also be mixed mechanically with one another. According to this method, polymers (A) and (B) are prepared separately and mixed in molten form.

In the case of successive syntheses, the process for obtaining the composition comprises two successive polymerization stages, in which there are respectively prepared from 55 to 74 parts by weight of propylene polymer (A) and from 26 to 45 parts by weight of polymer (B). Each of the polymerization stages can be performed, according to general conditions well known to those skilled in the art, in the same polymerization medium or in different polymerization media. Most often, the polymer present in preponderant quantity will be prepared first, followed by preparation of the minority polymer in the presence of the polymer obtained from the first stage. Each of these stages can be carried out, independently of one another, in suspension in an inert hydrocarbon diluent, in propylene maintained in liquid condition or else in the gas phase (in a stirred or preferably a fluidized bed).

The preferred procedure is polymerization in propylene maintained in liquid condition.

Within the scope of the present invention, it is also preferable to use polymers and/or compositions whose MFI is lower than the desired value, wherein this MFI is adjusted to the desired value by depolymerization ("visbreaking") in conventional manner, for example by mixing with an organic peroxide at high shear ratio.

The conditions of such depolymerization are well known to those skilled in the art and the description thereof is outside the context of this application. In this way there are obtained polymers and/or compositions whose molecular weight distribution is narrower than that of the original polymers and/or compositions, which may have effects on the use of the inventive compositions.

EXAMPLES

Having generally described this invention, a further understanding can be obtained by reference to certain specific examples which are provided herein for purposes of illustration only and are not intended to be limiting unless otherwise specified. The methods of measuring the variables mentioned in the examples, the units expressing these variables and the meanings of the symbols used in these examples are explained hereinafter.

MFI: melt flow index of the composition $MFI_{(A)}$: melt flow index of polymer (A) measured on a sample of this polymer $MFI_{(B)}$: melt flow index of polymer (B) calculated from the relation:

$$\log MFI = \frac{\{A\}}{100} \log MFI_{(A)} + \frac{\{B\}}{100} \log MFI_{(B)}$$

{A}: quantity of polymer (A) present in the composition relative to the total weight of polymer (A) plus polymer (B), expressed in % and estimated by measuring the titanium content of the sample taken at the end of the first stage and the titanium content of the composition {B}: quantity of polymer (B) present in the composition relative to the total weight of polymer (A) plus polymer (B), expressed in % and estimated from the relation {B}=100−{A}

C2 total: total ethylene content expressed in wt % relative to the weight of polymer (A) plus polymer (B), measured on a sample of sequenced polymer worked into a pressed 200 μm film C2(A): ethylene content of copolymer (A) determined on a sample of this polymer by infrared spectrometry as described hereinabove and expressed in wt % relative to the total weight of polymer (A)

C2(B): ethylene content of copolymer (B), determined from the relation:

$$C2(B) = \frac{C2 \text{ total} - \{A\}/100 \times C2(A)}{\{B\}/100}$$

II(A): isotacticity index of polymer (A), characterized by the molar fraction of isotactic triads (sequenced succession of three propylene monomer units in meso configuration). This value is determined on a sample of polymer (A) by 13C nuclear magnetic resonance as described in Macromolecules, Volume 6, No. 6, pp. 925–926 (1973) and in references (3) to (9) of that publication.

Examples 1 to 3

Two propylene polymers (polymers (A) and (B)) were prepared by successive polymerization reactions in liquid propylene in the presence of a catalytic system comprising a solid based on titanium trichloride such as described in Example 1 of U.S. Pat. No. 4,210,729 and diethylaluminum chloride. The respective quantities of catalytic solid and of aluminum compound are such that the Al/Ti molar ratio=10. A sample of polymer prepared in the first stage (polymer (A)) is taken for analysis at the end of the first stage.

The polymerization conditions as well as the properties of polymers (A) and (B) are presented in Table 1 hereinafter.

TABLE 1

| Characteristics | Example 1 | Example 2 | Example 3 |
|---|---|---|---|
| First stage - Polymer (A) | | | |
| Pressure (bar) | 20 | 20 | 20 |
| Temperature (° C.) | 65 | 65 | 65 |
| Hydrogen (mol %) | 3.4 | 3.2 | 3.4 |
| Ethylene (mol %) | 0 | 0 | 0 |
| Residence time (h) | 1.5 | 1.7 | 1.5 |
| Second stage - Polymer (B) | | | |
| Pressure (bar) | 20 | 20 | 20 |
| Temperature (° C.) | 50 | 50 | 50 |
| Hydrogen (mol %) | 9.4 | 9.2 | 9.1 |
| Ethylene (mol %) | 2.6 | 3.8 | 2.5 |

TABLE 1-continued

| Characteristics | Example 1 | Example 2 | Example 3 |
| --- | --- | --- | --- |
| Residence time (h) | 2.3 | 2.1 | 2.1 |
| Composition | | | |
| C2 total (wt %) | 2.6 | 2.8 | 2.0 |
| C2(A) (wt %) | 0 | 0 | 0 |
| C2(B) (wt %) | 6.3 | 9.0 | 5.7 |
| MFI (g/10 minutes) | 9.7 | 7.8 | 8.8 |
| MFI$_{(A)}$ (g/10 minutes) | 9.5 | 7.3 | 8.7 |
| MFI$_{(B)}$ (g/10 minutes) | 10.1 | 9.2 | 9.1 |
| {A} wt % | 59 | 69 | 65 |
| {B} wt % | 41 | 31 | 35 |

This application is based on the French language document, SPE 00/23, having the title, "Composition à Base de Polymères du Propylène et Procèdè Pour Son Obtention" the entire contents of which are hereby incorporated by reference, the same as if set forth at length.

Having now fully described this invention, it will be apparent to one of ordinary skill in the art that many changes and modifications can be made thereto without departing from the spirit or scope of the invention as set forth herein.

What is claimed is:

1. A composition comprising:
    (a) from 55 to 74 parts by weight of a propylene polymer (A) comprising less than or equal to 1% by weight of ethylene and having a melt flow index (MFI) of 0.1 to 30 g/10 minutes, measured according to ASTM D 1238 (1986) under a load of 2.16 kg at 230° C.; and
    (b) from 26 to 45 parts by weight of a polymer (B), which is a statistical copolymer of propylene comprising from 3.5 to 15 wt % of ethylene and having an MFI of 0.1 to 35 g/10 minutes.

2. The composition according to claim 1, wherein polymer (A) does not contain any monomeric units derived from 1-butene.

3. The composition according to claim 1, wherein polymer (B) does not contain any monomeric units derived from 1-butene.

4. The composition according to claim 1, wherein said composition has a flexural modulus of 1000 to 1400 MPa and an MFI of 4 to 12 g/10 minutes.

5. The composition according to claim 1, wherein polymer (A) has a flexural modulus, measured at 23° C. on an injection-molded specimen with a thickness of 4 mm in accordance with ASTM D 790 M, of 1200 to 2000 Mpa.

6. The composition according to claim 1, wherein polymer (B) has a flexural modulus of 300 to 800 Mpa.

7. The composition according to claim 1, wherein polymer (A) comprises at most 0.75 wt % of ethylene.

8. The composition according to claim 1, wherein polymer (A) has an isotacticity index of at most 98%.

9. The composition according to claim 1, wherein polymer (B) comprises at least 4 wt % of ethylene.

10. The composition according to claim 1, wherein the each of MFI$_{(A)}$ and MFI$_{(B)}$ is at least 1 g/10 minutes.

11. The composition according to claim 1, wherein MFI$_{(A)}$ is at most 15 g/10 minutes.

12. The composition according to claim 1, wherein MFI$_{(B)}$ is at most 20 g/10 minutes.

13. The composition according to claim 1, wherein a MFI$_{(B)}$/MFI$_{(A)}$ ratio satisfies the the equation $0.8 \leq MFI_{(B)}/MFI_{(A)} \leq 18$.

14. The composition according to claim 1, comprising from 55 to 74 parts by weight of a propylene polymer (A).

15. The composition according to claim 1, comprising from 26 to 45 parts by weight of polymer (B).

16. The composition according to claim 1, further comprising at least one selected from the group consisting of stabilizer, pigment, coloring agent, filler, nucleating agent, fire-retarding agent, antistatic agent, lubricant, non-stick agent, and mixtures thereof.

17. An article, comprising the composition according to claim 1.

18. The article according to claim 17, which is in the form of film, sheet, or expanded granule.

19. A process for preparing the composition according to claim 1, comprising two successive polymerization stages, wherein 55 to 74 parts by weight of polymer (A) and from 26 to 45 parts by weight of polymer (B) are respectively prepared.

20. The process according to claim 19, further comprising contacting polymer (A) and polymer (B).

21. The process according to claim 19, wherein a polymer present in a preponderant quantity in said composition is prepared in a first stage, and a polymer present in a minority quantity in said composition is prepared in the presence of the polymer obtained in the first stage.

* * * * *

UNITED STATES PATENT AND TRADEMARK OFFICE
CERTIFICATE OF CORRECTION

PATENT NO.    : 6,586,528 B1
DATED         : July 1, 2003
INVENTOR(S)   : Emmanuel Delaite and Hervé Cuypers It is certified that error appears in the above-identified patent and that said Letters Patent is hereby corrected as shown below:

<u>Column 7,</u>
Lines 27-28, "polymer (A) comprising at least 0.1% to not more than 1%" to read
-- polymer (A) comprising less than or equal to 1% --

Signed and Sealed this

Fourteenth Day of October, 2003

JAMES E. ROGAN
*Director of the United States Patent and Trademark Office*